A. S. KOBLING.
ELECTRIC RAILWAY CROSSING GATE.
APPLICATION FILED NOV. 6, 1912. RENEWED JAN. 3, 1914.

1,086,775.

Patented Feb. 10, 1914.
8 SHEETS—SHEET 1.

A. S. KOBLING.
ELECTRIC RAILWAY CROSSING GATE.
APPLICATION FILED NOV. 6, 1912. RENEWED JAN. 3, 1914.

1,086,775.

Patented Feb. 10, 1914.

WITNESSES

INVENTOR
A. S. Kobling

ATTORNEYS

A. S. KOBLING.
ELECTRIC RAILWAY CROSSING GATE.
APPLICATION FILED NOV. 6, 1912. RENEWED JAN. 3, 1914.

1,086,775.

Patented Feb. 10, 1914.

WITNESSES

INVENTOR
A. S. Kobling

ATTORNEYS

A. S. KOBLING.
ELECTRIC RAILWAY CROSSING GATE.
APPLICATION FILED NOV. 6, 1912. RENEWED JAN. 3, 1914.

1,086,775.

Patented Feb. 10, 1914.

WITNESSES

INVENTOR
A. S. Kobling

ATTORNEYS

UNITED STATES PATENT OFFICE.

ANTON S. KOBLING, OF WALLINGFORD, CONNECTICUT, ASSIGNOR, BY DIRECT AND MESNE ASSIGNMENTS, OF ONE-THIRD TO SOPHIA TOTH, ONE-SIXTH TO TONY BODAK, AND ONE-SIXTH TO ANDREW KRAJNYAK, OF WALLINGFORD, CONNECTICUT.

ELECTRIC-RAILWAY-CROSSING GATE.

1,086,775. Specification of Letters Patent. Patented Feb. 10, 1914.

Application filed November 6, 1912, Serial No. 729,879. Renewed January 3, 1914. Serial No. 810,256.

*To all whom it may concern:*

Be it known that I, ANTON S. KOBLING, a subject of the King of Hungary, residing at Wallingford, in the county of New Haven and State of Connecticut, have invented certain new and useful Improvements in Electric-Railway-Crossing Gates, of which the following is a specification, reference being had therein to the accompanying drawing.

This invention relates to electric railway crossing gates especially designed for a one-track system operating trains in one direction, but with certain modifications applicable to systems having more than one track and operating trains in both directions.

The primary object of my invention is to provide automatically controlled and electrically operated crossing gates having an alarm and gate opening and closing devices, all of which are employed for preventing pedestrians, animals and vehicles from being run down by rolling stock and injured or killed.

Another object of this invention is to provide a railway crossing gate that is electrically lowered by a novel mechanism and automatically released and restored to an open position by utilized springs or their mechanical equivalent.

A still further object of this invention is to provide crossing gates that are positive in their action, not liable to injury by ordinary use and highly efficient for insuring the safety of persons, animals and vehicles at a railway crossing.

The invention in its broadest aspect involves positive and reliable means for lowering and raising gates, the construction of the mechanism being such that immediately upon a train or rolling stock approaching the crossing the gates are lowered and an alarm continuously sounded while the train is passing, the gates being automatically raised as the rear end of the train passes over the crossing. To this end I have devised a gate operating mechanism that can be used in connection with various kinds of railways or roads and controlled by various kinds of rolling stock or vehicles.

In the accompanying drawings I have represented and herein I describe a good form of crossing gate embodying my invention so far as it is concerned with a railway, and adapted to effectuate my method of closing and opening the gates.

The principal elements of the invention,—namely, towers and gates, gate closing device, gate opening device and the track equipment will be hereinafter separately and specifically described in detail, together with several generic controlling and operating mechanisms, their associated coöperating appliances, and objects accomplished from such a combination of elements.

Figure 1:
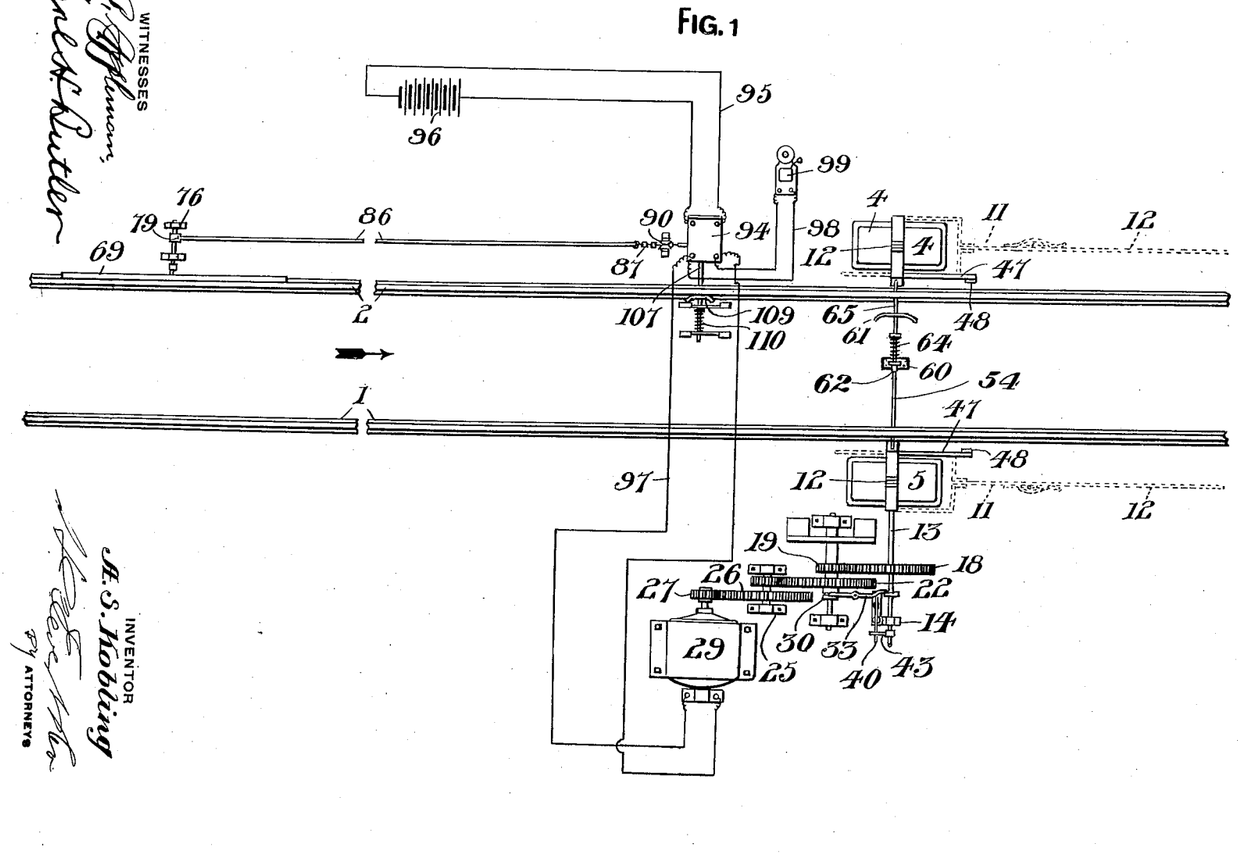
Figure 1 is a diagrammatic plan of the electric railway crossing gates in accordance with my invention.

*Towers and gates.*—Reference will first be had to Figs. 1 to 4 inclusive, particularly Fig. 1 showing a single track composed of rails 1 and 2. Located at the outer sides of the rails and oppositely disposed upon suitable foundations or structures 3 are towers 4 and 5 that are identical in construction. The towers are preferably made of metal and provided with detachable caps 6 whereby easy access can be had to the interior of said towers for assembling certain elements therein. Each tower has transversely alining bearings 7 for a rock shaft 8 having the ends thereof protruding from the sides of the tower. Mounted upon the ends of the rock shaft are the outer and inner arms 9 and 10 of a gate 11, said gate having the outer end thereof provided with a hinged spring pressed section 12 (see Fig. 10). The sections 12 of the gate are held normally in longitudinal alinement with the inner ends thereof and are capable of swinging outwardly from the track whereby persons entrapped between the gates, when a train is approaching can easily swing the sections 12 outwardly and escape from an approaching train.

Figures 3, 4:
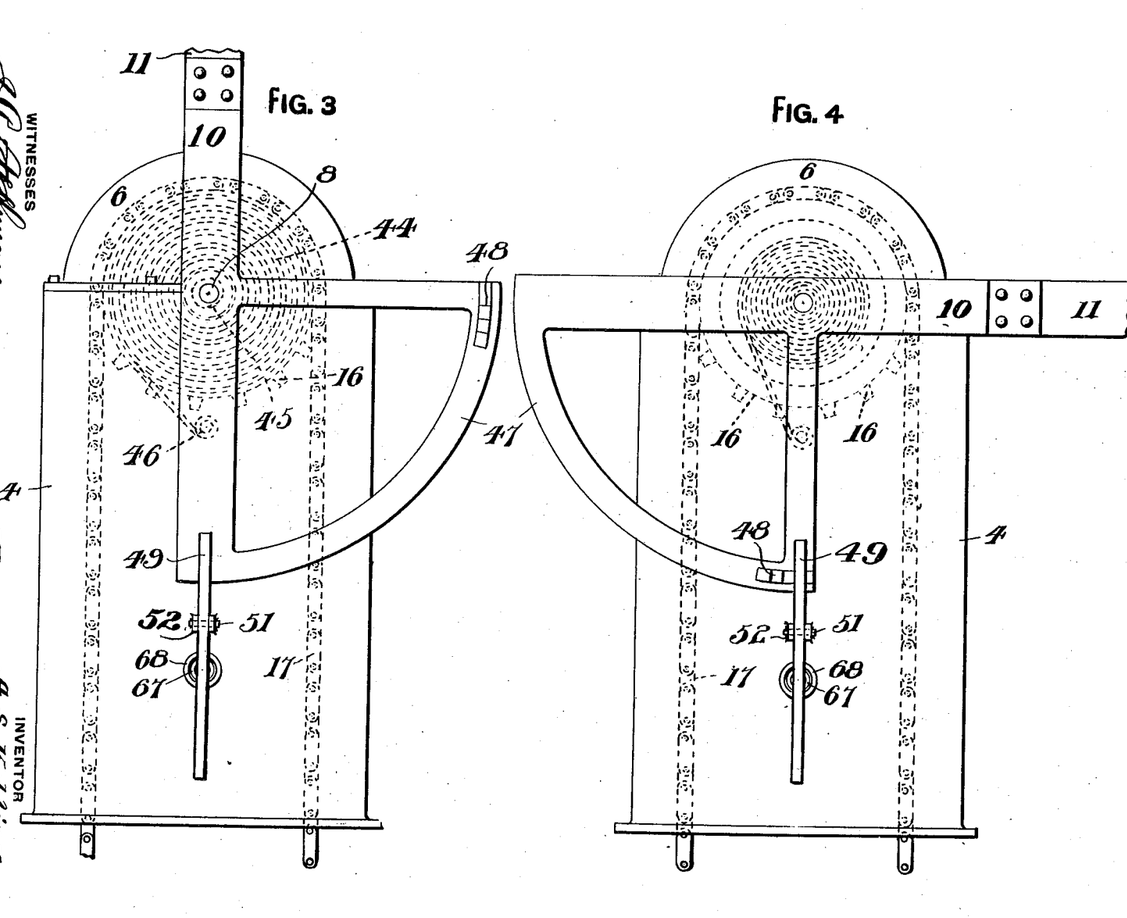
Fig. 3 is an enlarged elevation of the inner side of a tower showing a portion of a gate in an open position.
Fig. 4 is a similar view showing a portion of the gate in a closed position.
Figures 5, 6:
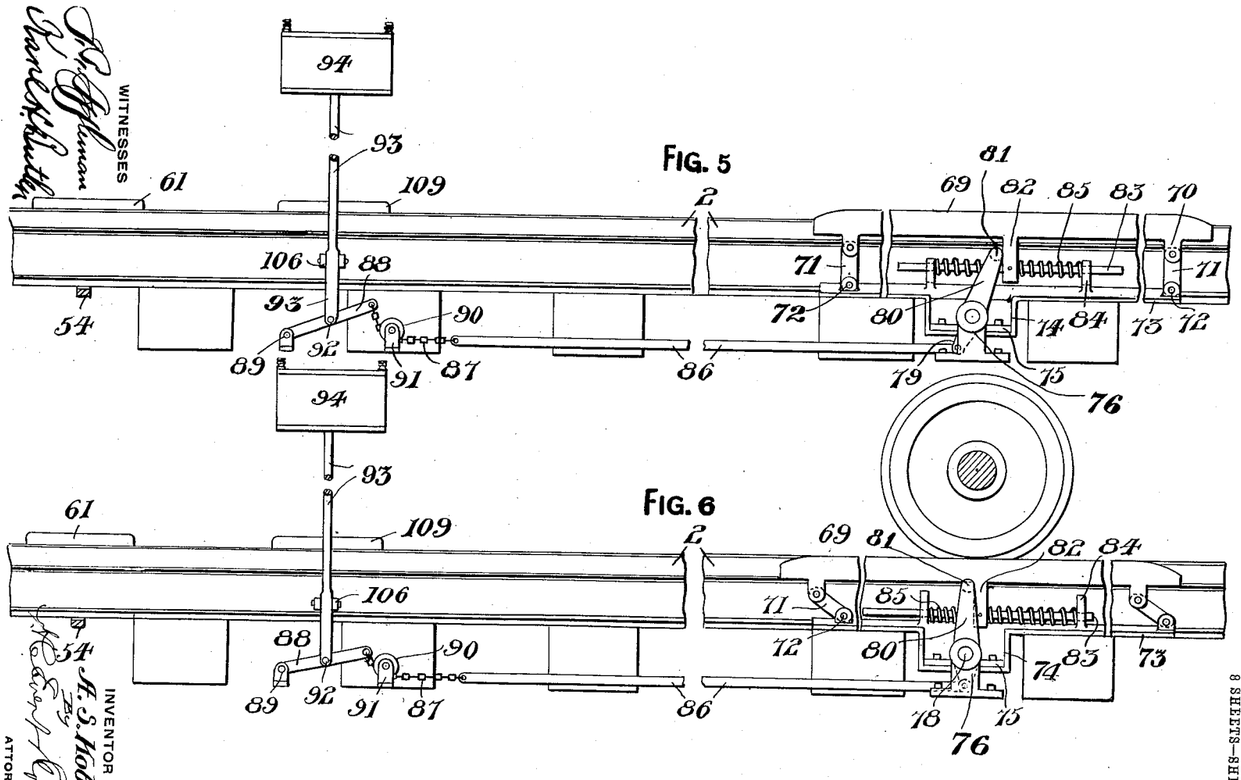
Fig. 5 is a side elevation of a gate closing device, showing the position of the device prior to actuation.
Fig. 6 is a similar view showing the device actuated.
Figure 7:
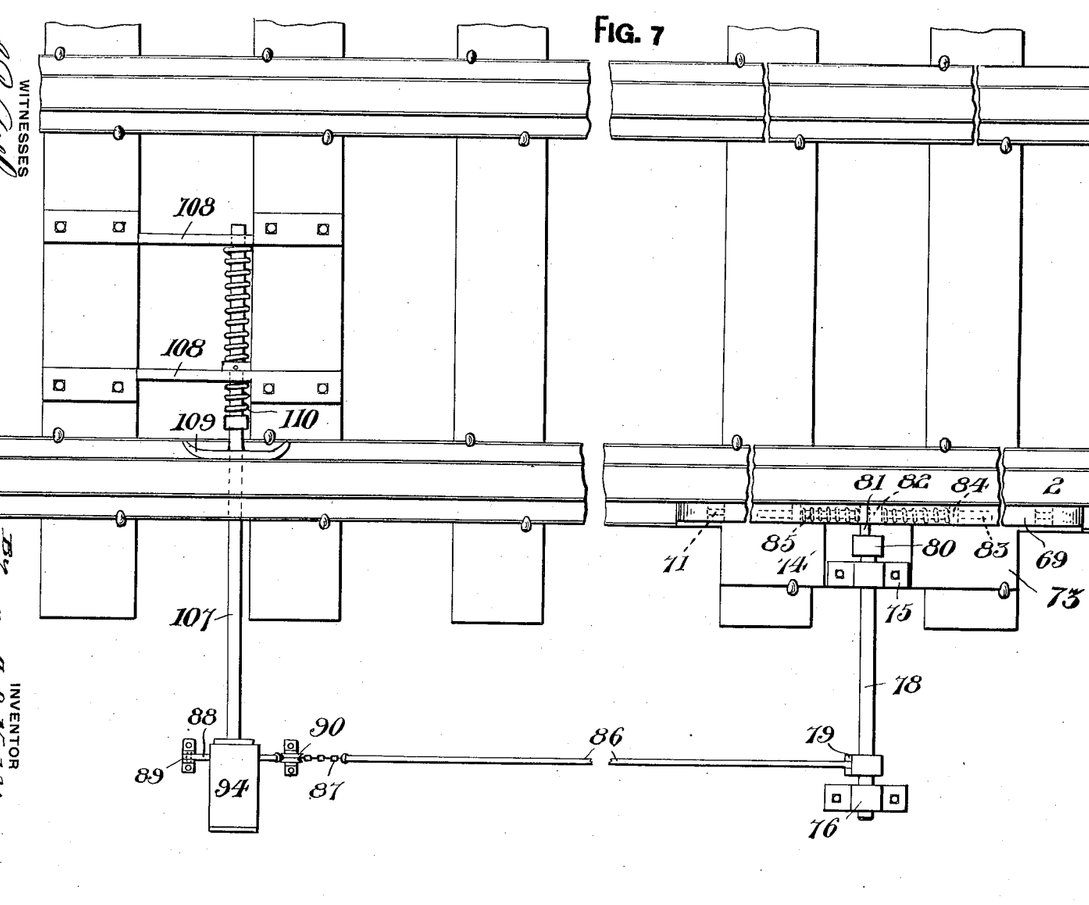
Fig. 7 is a plan of a gate closing device projected from the views of Figs. 5 and 6.

*Gate closing device.*—The foundations or structures 3 supporting the towers 4 and 5 contain a gate closing device or mechanism, best shown in Figs. 11 to 15 inclusive and Figs. 3 and 4. In the structures 3 there is located a main operating shaft 13 that extends beneath the track, said shaft being journaled in suitable bearings 14. The shaft 13 directly beneath the towers 4 and 5 has sprocket wheels 15 vertically alining with similar wheels 16 mounted upon the shafts 8 within the towers 4 and 5. Connecting the sprocket wheels 15 and 16 are endless sprocket chains 17. The shaft 13 is provided with a large gear wheel 18 meshing with a small gear wheel 19 mounted upon a shaft 20, journaled in bearings 21. Loosely mounted upon the shaft 20 is a large gear wheel 22 meshing with a small gear wheel 23 mounted upon a shaft 24 journaled in bearings 25. Mounted upon the shaft 24 is a large gear wheel 26 meshing with a small gear wheel 27 mounted upon the armature shaft 28 of an electric motor 29, which is so constructed as to withstand a continuous application of electrical pressure.

Figure 11:
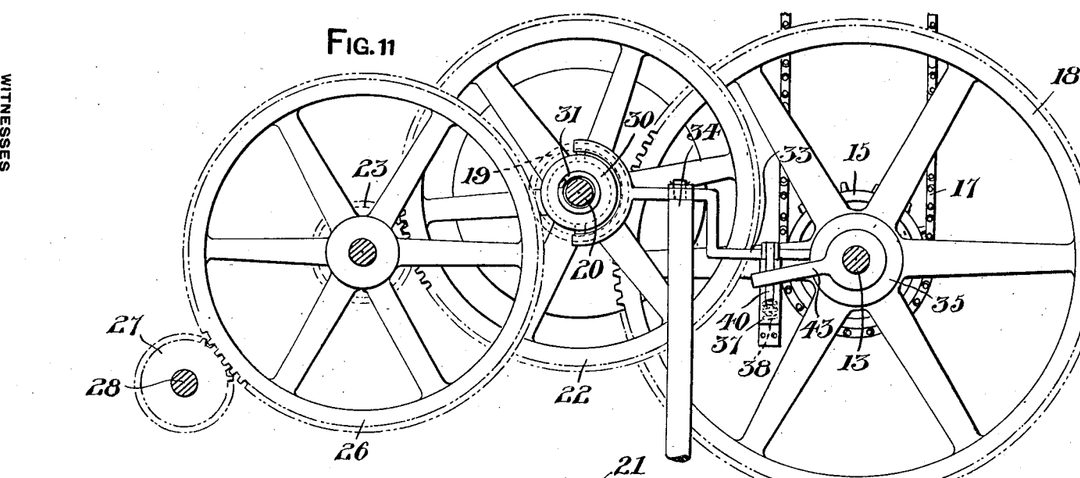
Fig. 11 is an enlarged longitudinal sectional view of the gate operating mechanism.
Figure 12:
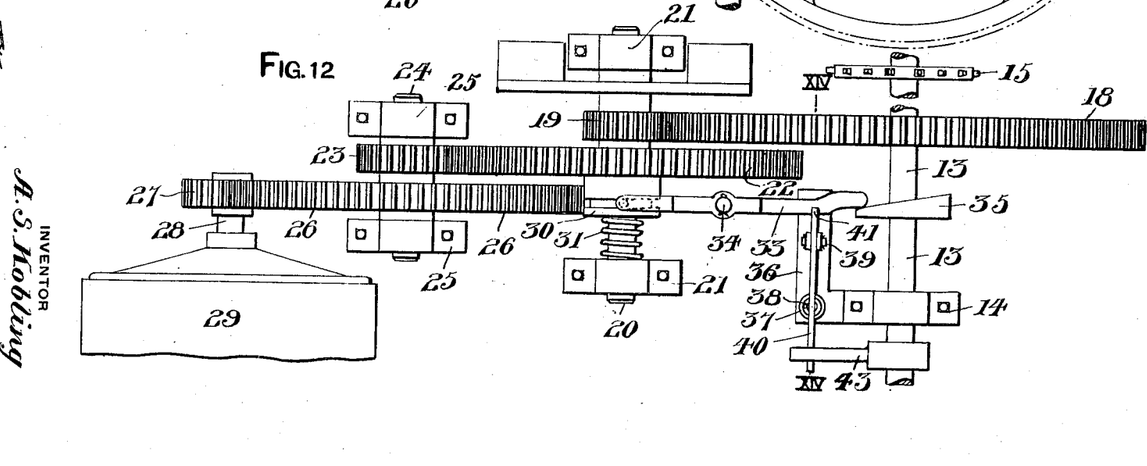
Fig. 12 is a plan of the same, showing a mechanism as actuated for opening a gate.
Figures 13, 14, 15:
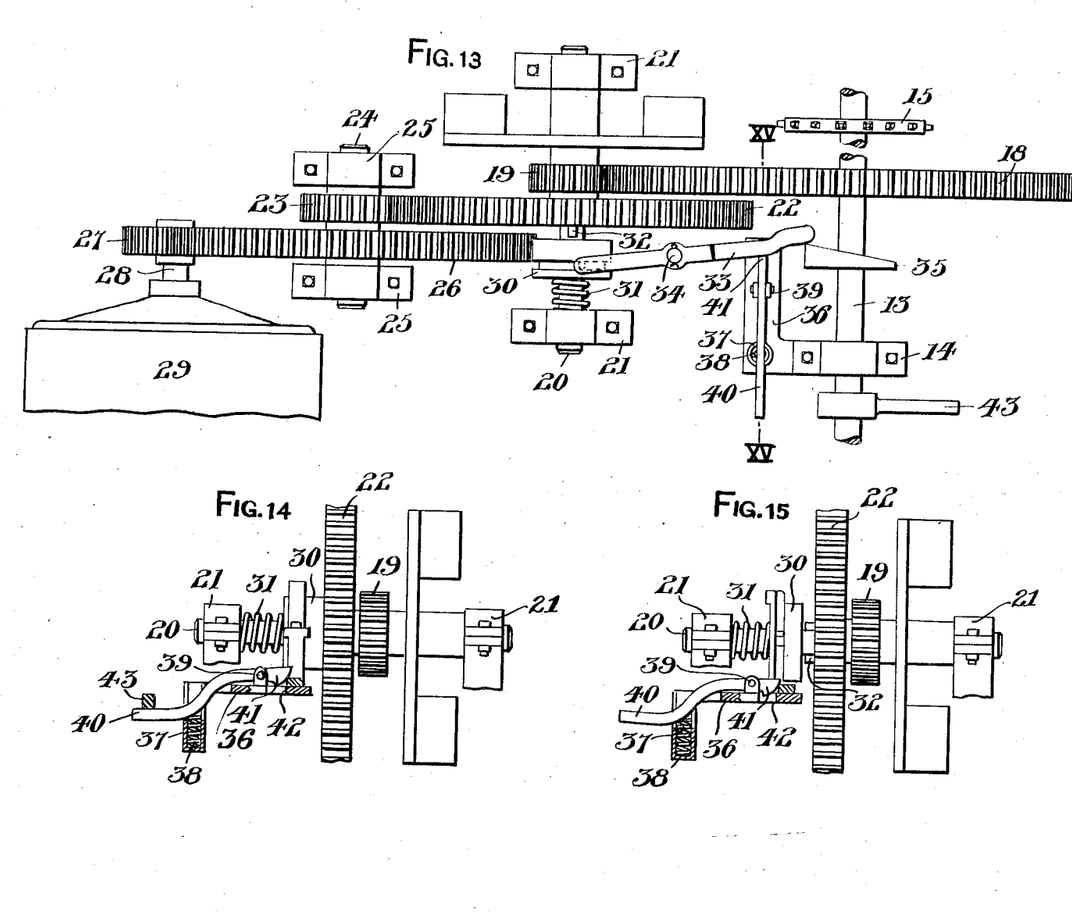
Fig. 13 is a similar view showing the mechanism actuated to release a gate.
Fig. 14 is an enlarged cross sectional view taken on the line XIV—XIV of Fig. 12.
Fig. 15 is a similar view taken on the line XV—XV of Fig. 13.

The gear wheels 18, 19, 22, 23, 26 and 27 represent a train of gears or transmission mechanism for imparting movement to the shaft 13 from the electric motor 29, and the operation of the shaft 13 in one direction is controlled by a clutch member 30 slidably mounted upon the shaft 20 to rotate therewith. The clutch member 30 is spring pressed by a spring 31 encircling the shaft 20, between one of the bearings 21 and the clutch member. The clutch member is adapted to engage clutch members 32, carried by the large gear wheel 22 to cause said gear wheel to revolve with the shaft 20. The clutch members 30 and 32 are of the ordinary and well known type and the member 30 is engaged by a fulcrumed, horizontal lever 33 mounted upon a suitable bearing 34 adjacent to the clutch members. The end of the lever 33 is held normally against the side of a cam 35 mounted upon the shaft 13, said cam shifting said lever to move the clutch member 30, whereby the shafts 20 and 13 are free to revolve independent of the electric motor.

The bearing 14 adjacent to the cam 35 is provided with a bracket 36 having a socket 37 for a coiled compression spring 38. The bracket is provided with bearings 39 for a latch 40 that has a beveled end 41 engaging the end of the lever 33. The bracket 36 is slotted, as at 42 to provide clearance for said latch and said latch is normally held in engagement with the lever 33 by a compression spring 38. The latch 40 is in the path of a radially disposed crank or arm 43, carried by the shaft 13 and positioned for operation when the cam 35 is inactive.

Figure 2:
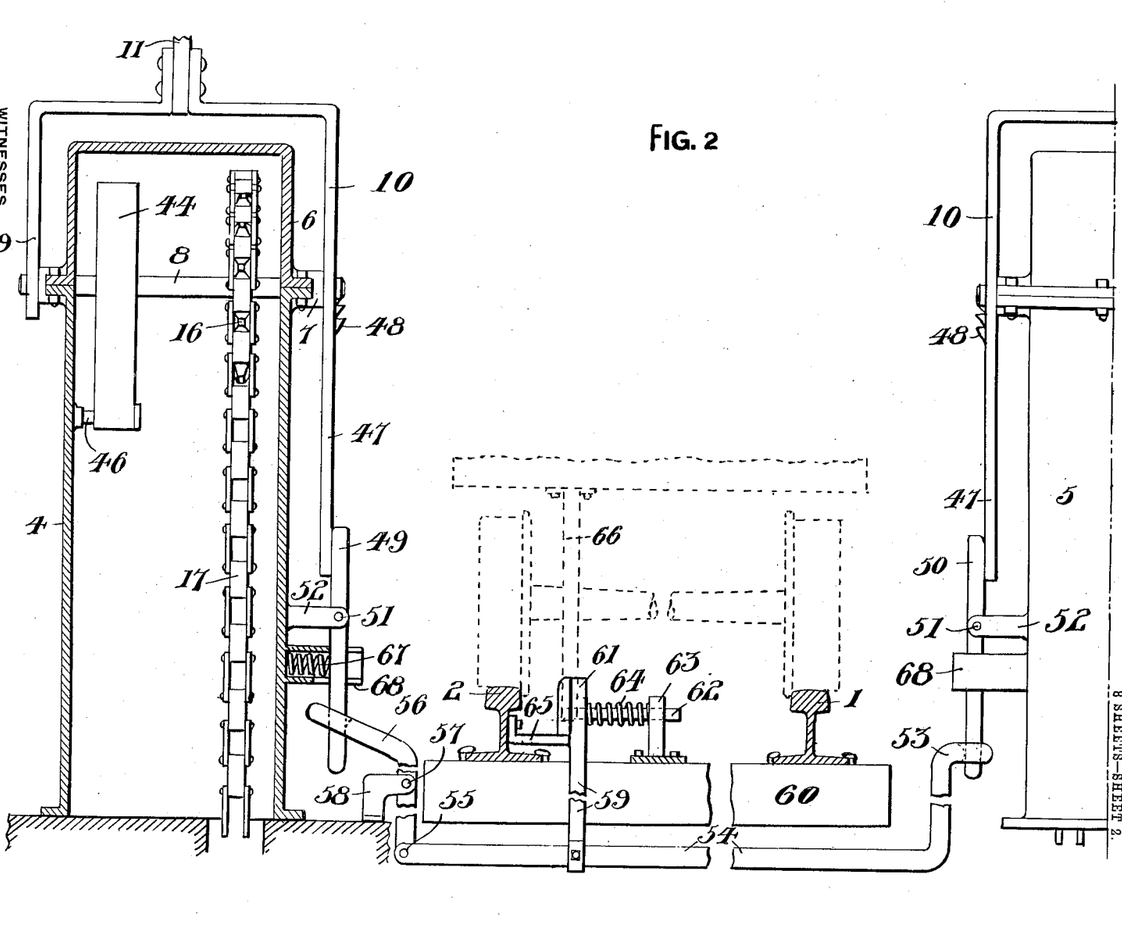
Fig. 2 is an enlarged cross sectional view of a track showing a portion of a tower in elevation and another tower in vertical section, together with a gate releasing mechanism.

*Gate opening device.*—Referring to Figs. 2 to 4 inclusive, it will be observed that the shaft 8 of each tower is encircled by a spiral band spring 44 that has one end thereof attached to the shaft 8, as at 45 and the opposite end thereof to a pin 46, carried by the inner side of the tower. When the shaft 8 is rocked in one direction, closing the gate 11, the band spring 44 is wound or placed under tension, as shown in Fig. 4.

The inner arms 10 of the gates have sectors 47 provided with racks 48. The racks 48 are engaged by pawls 49 and 50 pivotally connected, as at 51 to bearings 52 carried by the towers 4 and 5. The lower end of the pawl 50 is engaged by the bifurcated angle end 53 of a rod 54 extending beneath the track toward the tower 4, said rod being pivotally connected, as at 55 to an angle arm 56 that has a bifurcated end engaging the lower end of the pawl 49. The angle arm 56 is pivotally mounted, as at 57 in a bearing 58, located adjacent to the tower.

Connected to the rod 54 is a wheel actuated trip, comprising an upright 59 that extends upwardly between ties or foundation blocks 60. The upper end of the upright has a contact piece 61 provided with a rod 62 slidably mounted in a bearing 63 carried by the foundation blocks or ties 60. Encircling the rod 62 is a coiled compression spring 64 that holds the contact piece 61 normally in engagement with a stop 65, carried by the inner side of the rail 2. The contact piece 61 is spaced apart from the rail 2 and is adapted to be engaged by a depending detachable member 66 arranged upon a car or at the end of a train, whereby the member will engage the contact piece and shift the upright 59 and the rod 54. The ends of the rod move the pawls 49 and 50 out of engagement with the racks 48 and allow the springs 44, which have been placed under tension, to close the gates.

The pawls 49 and 50 are normally in engagement with the inner arms 10 of the gates by coiled compression springs 67 arranged in slotted tubular guides 68, carried by the towers 4 and 5. The slotted tubular guides 68 serve as guides and braces for the pawls 49 and 50 and said pawls can readily recede when passing over and into engagement with the teeth of the racks 48.

*Track equipment.*—Reference will now be had to Figs. 1, 5 to 9 inclusive. Located some distance "down" the track, the distance equivalent to the length of the longest train, is a shoe 69 arranged at the outer side of the rail 2 against the head thereof and extending above the head to be engaged by a wheel of rolling stock. The shoe 69 has the ends thereof provided with apertured lugs 70 pivotally connected by links 71 to apertured lugs 72 of a tie plate 73. The tie plate 73 has a hanger 74 provided with a bearing 75 and adjacent to the bearing 75 is another bearing 76 suitably supported at the side of the track. Journaled in the bearings 75 and 76 is a rock shaft 78 having a crank 79 adjacent to the bearings 76 and a crank 80 adjacent to the bearing 75. The crank 80 is provided with a pin 81 engaging a depending apertured lug 82, carried by the bottom of the shoe 69. Extending through the apertured lug 82 is a guide rod 83 mounted in bearings 84, carried by the tie plate 73. Encircling the rod 83 between the bearings 84 and the lug 82 are coiled compression springs 85 that hold the shoe 69 normally above the tread or head of the rail 2.

Connected to the crank 79 is a reach rod or rods 86 that is in parallelism with the track to a point in proximity to the towers 4 and 5, where it is connected by a chain 87 or other flexible connection to a lever 88 pivotally connected to a bearing 89 suitably supported at the side of the track. The chain 87 extends under a revoluble sheave 90 carried by a bearing 91 adjacent to the lever 88. The lever 88 is pivotally connected, as at 92 to the lower end of a plunger 93 that extends into a cut-out device 94 located adjacent to the tower 4. Now, this cut-out device is of the ordinary and well known type used in connection with a great many electrical apparatus and other than that the plunger 93 is spring actuated and normally elevated, the structural details of the cut-out device form no part of this invention. The cut-out device is connected by wires 95 to an electric generator or storage batteries 96 and by wires 97 to the motor 29. The cut-out device is also connected by wires 98 to an electric bell 99 or an audible signal.

Figures 8, 9, 10:
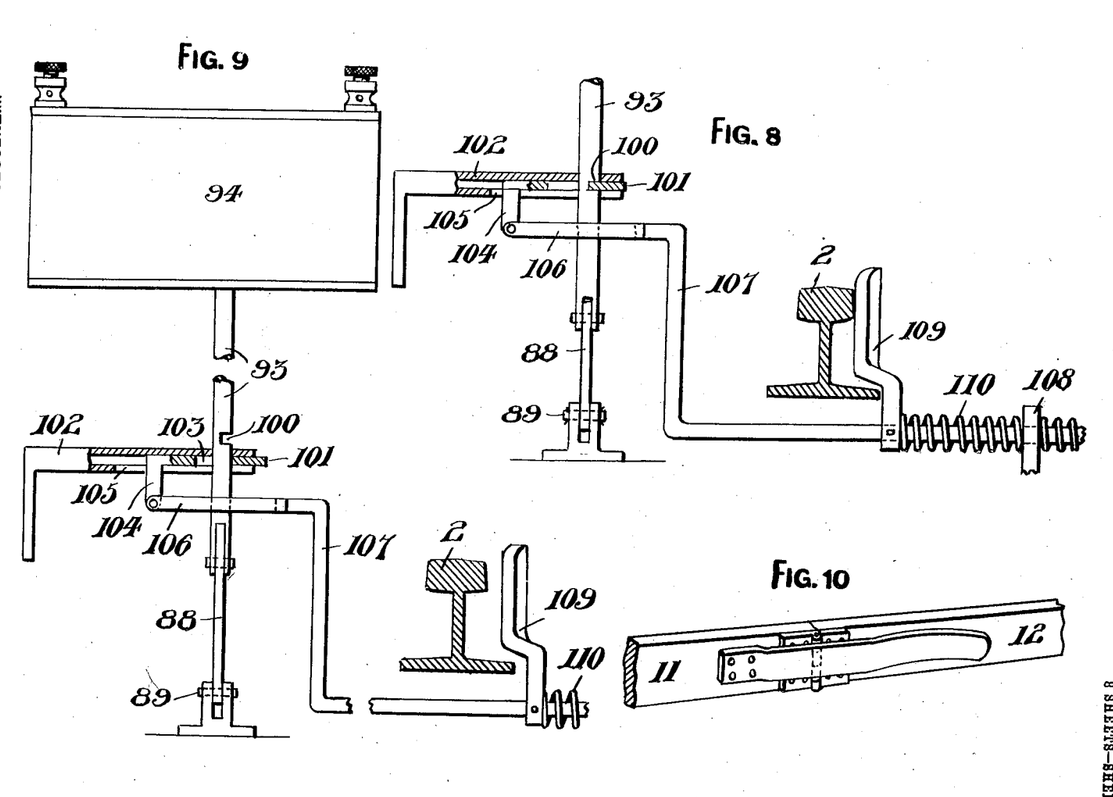
Fig. 8 is a similar view of the mechanism as actuated.
Fig. 9 is an enlarged cross sectional view of a portion of the gate closing device in connection with an automatic electric cut-out, showing the mechanism prior to actuation.
Fig. 10 is a perspective view of a portion of a gate.

The plunger 93, adjacent to the lower end thereof, has a notch 100 and when the plunger is lowered, through the medium of the elements 69 to 91 inclusive, a slide 101 engages in the notch 100 and locks the plunger 93 in a lowered position. The slide 101 is arranged in a bearing or bracket 102 beneath the cut out 94. The slide 101 has an opening 103 providing clearance for the plunger 70 and a depending arm 104 extending through a slot 105 in the bracket 102. The arm 104 is connected to a yoke 106 carried by a connecting member 107 that extends under the rail 2 and through bearings 108, adjacent to said rail. The member is provided with a fixed shoe 109 that extends in proximity to the tread or head of the rail 2, and engaging the fixed end of said shoe and the bearings 108 is a coiled compression spring 110 that encircles the member 107.

*General operation.*—When a train is approaching the towers 4 and 5 in the direction of the arrow, as shown in Fig. 1, a wheel of a locomotive or car encounters the depressions of the shoe 69. The shoe 69 is pushed forwardly and downwardly and through the medium of the lug 82, pin 81 and crank 80 the shaft 78 is rocked. As the shoe 69 is of greater length than the distance between two trucks or the length of a car, said shoe is retained in a lowered position as long as a train is approaching the towers. When the shaft 78 is rocked the plunger 93 of the cut-out 94 is lowered through the medium of the elements 86 to 91 inclusive and is immediately locked in a lowered position by the slide 101 which is shifted by the spring pressed connecting member 107. The shoe 109 is therefore carried into engagement with the rail 2, as shown in Fig. 8. When the plunger 93 of the cut-out is lowered electric circuits are immediately established between the source of electric energy 96, the motor 29 and the electric bell 99.

When the motor 29 is placed in operation the gate closing device is in the position shown in Figs. 11 and 12, clutch member 30 is in engagement with the clutch member 32. The motor therefore imparts movement to the shaft 13 and movement from this shaft is imparted to the shafts 8 of the towers 4 and 5 through the medium of the sprocket wheels 15 and 16 and the sprocket chains 17. The shafts 8 are therefore rocked and the gates 11 lowered, placing the springs 44 under tension. The gates 11 are locked in a lowered position by the spring pressed pawls 49 and 50 engaging the racks 48 of the gate arms 10. Immediately upon the gates reaching a lowered and locked position the cam 35 of the shaft 13 shifts the lever 33 and moves the clutch member 30 out of engagement with the member 32. The spring pressed latch 40 locks the lever 33 holding the spring 31 associated with the clutch member 30 under tension.

As the circuit has been completed through the electric bell 99 an audible signal is sounded that continues to sound until the locomotive or first car encounters the shoe 109, which is engaged by a flanged wheel and through the medium of the connecting member 107 moves the slide 101 out of engagement with the plunger 93, as shown in Fig. 9, thereby releasing the plunger and through the medium of the cut-out 94 the circuit is broken to the motor 29 and the electric bell 99. The locomotive or first car is by this time at the crossing and the gates are closed. The rear end of the train or last car has passed off the shoe 69 prior to the plunger 93 being released, consequently the shoe 69 is restored to its normal position through the medium of the springs 85.

As the last car reaches the crossing the member 66 carried by the car encounters the contact piece 61 of the gate releasing mechanism and the trip, shown in Fig. 2, is shifted to move the pawls 49 and 50, releasing the arms 10 of the gates 11 and allowing the springs 44, which have been under tension while the gates have been closed, to elevate or raise the gates to an open position. Of course the shafts 8 are rocked, and impart movement to the shaft 13 causing the crank 43 to impinge the outer end of the latch 40 and raise the inner end thereof, release the lever 33 and allow the spring 31 to place the clutch member 30 in engagement with the clutch member 32. The gate closing device is therefore restored to its normal position and is in condition to again be set in operation by another train or car engaging the shoe 69.

The detachable member 66 can be made a part of a train or car equipment and it is the duty of a trainman, to see that the said member is in position for use in connection with a track having crossing gates in accordance with this invention.

It is thought that the operation and utility of the invention will be apparent without further description and while in the drawings there is illustrated a preferred embodiment of the invention, it is to be understood that the structural elements are susceptible to such changes, as in the size, shape and manner of assemblage as fall within the scope of the appended claims.

What I claim is:—

1. In electric railway gates for crossings, the combination with a track, and a suitable source of electric energy, of towers at the side of said track, gates supported by said towers, a gate-closing device adjacent to said towers and including an electric motor in circuit with said source of electric energy, a train of gears and a transmission mechanism extending into said towers for lowering said gates, a track equipment including a shoe and cut-out for completing a circuit in connection with said motor, a track equipment including a shoe in connection with said cut-out for breaking the circuit in connection with said motor, means within said towers for raising said gates, and means at said towers for locking said gates in a lowered position.

2. In electric railway gates for crossings, the combination with a track, and a suitable source of electric energy, of towers at the side of said track, gates supported by said towers, a gate closing device adjacent to said towers and including an electric motor in circuit with said source of electric energy, a train of gears and a transmission mechanism extending into said towers for lowering said gates, a track equipment including a shoe and cut-out for completing a circuit in connection with said motor, a track equipment including a shoe in connection with said cutout for breaking the circuit in connection with said motor, means within said towers for raising said gates, means at said towers for locking said gates in a lowered position, and means adjacent to said track and actuated by rolling stock thereon for releasing the locking means of said gates.

3. In electric gates for railway crossings, the combination with a track, and a suitable source of electric energy, of towers, gates carried thereby, means including an electric motor in circuit with said source of electric energy and a transmission mechanism extending into said towers for lowering said gates, means at said tower and including spring pressed pawls and a trip for locking said gates in a lowered position, and a member adapted to be carried by rolling stock to engage said trip and release said locking mechanism.

4. In electric gates for railway crossings, the combination with a track, and a suitable source of electric energy, of towers, gates carried thereby, means including an electric motor in circuit with said source of electric energy and a transmission mechanism extending into said towers for lowering said gates, means at said tower and including spring pressed pawls and a trip for locking said gates in a lowered position, a member adapted to be carried by rolling stock to engage said trip and release said locking mechanism, and means arranged within said towers and independent of the first mentioned means for elevating said gates.

5. In electric gates for railway crossings, the combination with a track, and a suitable source of electric energy, of towers, gates carried thereby, means including an electric motor in circuit with said source of electric energy and a transmission mechanism extending into said towers for lowering said gates, means at said tower and including spring pressed pawls and a trip for locking said gates in a lowered position, a member adapted to be carried by rolling stock to engage said trip and release said locking mechanism, means arranged within said towers and independent of the first mentioned means for elevating said gates, and means including track shoes and a cut out in circuit with said source of electric energy for controlling the operation of said motor.

In testimony whereof I affix my signature in the presence of two witnesses.

ANTON S. KOBLING.

Witnesses:
 DONOTS GOMMARING,
 JOHN J. BARTEK, Jr.